(12) United States Patent
Shim et al.

(10) Patent No.: US 7,372,184 B2
(45) Date of Patent: May 13, 2008

(54) STATOR OF MOTOR

(75) Inventors: Jang Ho Shim, Seoul (KR); Jin Soo Park, Inchun-si (KR); Byung Taek Kim, Ansan-si (KR)

(73) Assignee: LG Electronics Inc., Seoul (KR)

( * ) Notice: Subject to any disclaimer, the term of this patent is extended or adjusted under 35 U.S.C. 154(b) by 58 days.

(21) Appl. No.: 11/203,248

(22) Filed: Aug. 15, 2005

(65) Prior Publication Data
US 2006/0055275 A1   Mar. 16, 2006

(30) Foreign Application Priority Data
Aug. 25, 2004   (KR) ...................... 10-2004-0067202

(51) Int. Cl.
*H02K 1/28* (2006.01)
(52) U.S. Cl. ...................... 310/216; 310/259; 310/218
(58) Field of Classification Search ........ 310/216–218, 310/254, 259, 89.12, 194, 215
See application file for complete search history.

(56) References Cited

U.S. PATENT DOCUMENTS

| | | | | |
|---|---|---|---|---|
| 4,835,839 A * | 6/1989 | Forbes et al. ................. 29/596 |
| 4,912,353 A | 3/1990 | Kondo et al. |
| 5,798,583 A * | 8/1998 | Morita ......................... 310/42 |
| 5,831,366 A * | 11/1998 | Kern et al. ................. 310/216 |
| 5,853,513 A * | 12/1998 | Kelsic ..................... 156/89.12 |
| 6,566,784 B1 * | 5/2003 | Hsu ........................... 310/254 |
| 6,580,193 B2 * | 6/2003 | Yoshikawa et al. .......... 310/215 |
| 6,703,745 B2 * | 3/2004 | Chu ....................... 310/156.45 |
| 6,729,011 B2 * | 5/2004 | Asao et al. .................... 29/596 |
| 6,741,005 B2 * | 5/2004 | Vohlgemuth ................ 310/216 |
| 6,844,653 B2 * | 1/2005 | Kolomeitsev et al. ...... 310/218 |
| 7,122,934 B2 * | 10/2006 | Yamamoto et al. ......... 310/218 |
| 2001/0013168 A1 | 8/2001 | Asao et al. |
| 2003/0006664 A1 * | 1/2003 | Eggers et al. .............. 310/218 |
| 2003/0168926 A1 * | 9/2003 | Zepp et al. ................. 310/216 |
| 2003/0184183 A1 * | 10/2003 | Sakai et al. ................. 310/254 |
| 2004/0051417 A1 * | 3/2004 | Yamazaki et al. .......... 310/216 |
| 2004/0068857 A1 * | 4/2004 | Park et al. ..................... 29/596 |
| 2004/0070304 A1 * | 4/2004 | Enomoto et al. ........... 310/218 |
| 2004/0084988 A1 * | 5/2004 | Sheeran et al. ............. 310/218 |
| 2004/0119371 A1 | 6/2004 | Laing |

(Continued)

FOREIGN PATENT DOCUMENTS

DE        3436511 A1    4/1986

(Continued)

*Primary Examiner*—Thanh Lam
(74) *Attorney, Agent, or Firm*—Birch, Stewart, Kolasch & Birch, LLP

(57) ABSTRACT

A stator of a motor having various shapes and capable of minimizing the manufacturing costs. At least teeth are manufactured by the iron powder metallurgy method. In order to obtain the overhang effect, the height of a tip of each tooth is lower than the height of a rotor and the height of a yoke is higher than the height of a tip of each tooth so as to minimize the core loss of the yoke. Since, in order to minimize the end coil, the height of a neck of each tooth is gradually higher as running from the sides to the central portion in the circumferential direction, costs for manufacturing a motor can be minimized and sufficient efficiency can be obtained.

27 Claims, 7 Drawing Sheets

U.S. PATENT DOCUMENTS

| | | | |
|---|---|---|---|
| 2004/0124732 A1* | 7/2004 | Hans | 310/216 |
| 2004/0124734 A1* | 7/2004 | Liao | 310/218 |
| 2004/0140728 A1* | 7/2004 | Dairi | 310/217 |
| 2006/0197399 A1* | 9/2006 | Kataoka et al. | 310/216 |
| 2006/0226729 A1* | 10/2006 | Du et al. | 310/218 |

FOREIGN PATENT DOCUMENTS

| | | | |
|---|---|---|---|
| JP | 2000-184628 A | | 6/2000 |
| JP | 2000236638 A | * | 8/2000 |
| JP | 2000-324777 A | | 11/2000 |
| JP | 2001157390 A | * | 6/2001 |
| JP | 2001-238420 A | | 8/2001 |
| JP | 2002-101583 A | | 4/2002 |
| JP | 2002136003 A | * | 5/2002 |
| JP | 2002176738 A | * | 6/2002 |
| JP | 2004-040948 A | | 2/2004 |
| JP | 2004208386 A | * | 7/2004 |
| JP | 2006246621 A | * | 9/2006 |
| SU | 486428 | | 1/1976 |
| SU | 729754 | | 4/1980 |
| SU | 936226 | | 6/1982 |
| SU | 1001316 | | 2/1983 |
| SU | 1234915 A1 | | 5/1986 |

* cited by examiner

STATOR OF MOTOR

BACKGROUND OF THE INVENTION

1. Field of the Invention

The present invention relates to a motor, and more particularly to a stator of a motor in which the height of each tooth's tip is lower than the height of a rotor and the height of a yoke is higher than the teeth's tip so that costs for manufacturing a motor is decreased and the efficiency of the motor is increased.

2. Description of the Related Art

Generally, a motor generates a driving force by which a rotor is driven by electromagnetic interaction between a stator and the rotor.

FIGS. 1 and 2 are views illustrating the stator of a conventional motor.

A stator 10 of a motor, as shown in FIGS. 1 and 2, includes a ring-shaped yoke 12 disposed at the outside of a rotor 20, a plurality of teeth 16 protruding from the inner wall of the yoke 12 toward the rotor 20 in the radial direction, forming slots 14 therebetween to have a desired shape, and being spaced apart from each other, and coils 18 wound around the teeth 16 and electrically connected to an external electric power.

The stator 10 constructed as described above is described as follows.

First, stator sheets 10' having planar shapes of the yoke 12 and the teeth 16 are manufactured from a very thin electrical steel sheet in the blanking process (See FIGS. 2a and 2b). Next, the stator sheets 10' are laminated so as to have a predetermined height and a desired shape 10", and the coils 18 are wound around the laminated stator sheet 10", so that a stator 10 is completed.

Here, as shown in FIG. 2a, the remainder of the electrical steel sheet 30 out which the stator sheets 10' are cut, namely, a scrap 30' is of use and is disposed of.

Hereinafter, since the basic structure of the conventional stator is similar to the stator shown in FIGS. 1 and 2, the detailed description and drawings thereof may be omitted.

Though not depicted in the accompanying drawings, the conventional stator may have the yoke and teeth integrated with each other by the iron powder metallurgy method.

Otherwise, as shown in FIG. 3, a stator 40 may be manufactured such that a yoke 42 is cut out from an electrical steel sheet and teeth 44 are manufactured by the iron powder metallurgy method.

According to the stator manufactured by the conventional process, if all conditions except for the stator 10 in FIGS. 1 and 2 and the manufacturing method are same, manufacturing costs can be reduced by manufacturing some parts using the iron powder metallurgy method in comparison to the stator 10 in FIGS. 1 and 2. However, since the magnetic characteristics of the iron powder is not better than that of the electrical steel sheet, the efficiency of a motor including the conventional stator in FIG. 3 becomes remarkably worse than that of a motor including the stator 10 in FIGS. 1 and 2.

Meanwhile, according the conventional manufacturing method as shown in FIG. 3, since the stator 40 is manufactured such that the heights of the yoke 42 and the teeth 44 are lower than the height of a rotor 40', effective magnetic fluxes passing through the teeth 44 are increased by the over-hang effect so that the efficiency of a motor can be enhanced.

However, if the stator 40 is manufactured by the iron powder metallurgy method, since the height of the stator 40 is lower than the height of the rotor 40' in order to obtain the overhang effect, it is difficult to increase the efficiency of a motor because of a large amount of the increased core loss of the yoke 42.

SUMMARY OF THE INVENTION

Therefore, the present invention has been made in view of the above and/or other problems, and it is an object of the present invention to provide a stator of a motor of which some parts of the stator are manufactured according to the iron powder metallurgy method so as to reduce costs, to minimize core loss, and to enhance the efficiency of a motor due to the overhang effect.

In accordance with the present invention, the above and other objects can be accomplished by the provision of a stator of a motor including a plurality of teeth spaced apart from each other along the circumference of a rotor, a yoke for connecting the teeth to each other, and coils wound around the teeth, wherein the height of a tip of each tooth facing the rotor is lower than the height of the rotor, and the height of the yoke is higher than the height of the tip of each tooth.

Preferably, each tooth has a neck, between the tip of each tooth and the yoke, around which the coil is wound, and the height of the neck of each tooth is gradually higher while running from the sides thereof to the central portion thereof in the circumferential direction. The height of the neck of each tooth is lower than that of the tip of each tooth.

According to the stator of a motor of the present invention, the teeth and the yoke are integrated with each other by the iron powder metallurgy method.

The object of the present invention can also be achieved by the provision of a stator of a motor including a plurality of teeth spaced apart from each other along the circumference of a rotor, a yoke for connecting the teeth to each other, and coils wound around the teeth, wherein the height of a tip of each tooth facing the rotor is lower than the height of the rotor, the height of the yoke (110) is higher than the height of the tip of each tooth, and the teeth and the yoke are made of different materials.

Preferably, the teeth are manufactured by the iron powder metallurgy method, and the yoke is manufactured from an electrical steel sheet by the spiral method.

The teeth and the yoke are coupled to each other in the vertical direction by fitting.

Each tooth has a connector inserted into a connector recess formed on the inner wall of the yoke in the vertical direction. In addition, the circumferential widths of the connector of each tooth and the connector recess of the yoke are gradually widened towards the yoke so as to prevent the separation in the radial direction.

The height of each tooth is equal to or greater than the height of the tip of each tooth, but not higher than the height of the yoke.

Each tooth has a neck, provided between the tip of each tooth and the yoke, around which the coils are wound, and the height of the neck of each tooth is gradually higher from the sides thereof to the central portion thereof. The height of the neck of each tooth is lower than the height of the tip of each tooth.

The object of the present invention can also be accomplished by the provision of a stator of a motor including a plurality of teeth spaced apart from each other along the circumference of a rotor, a yoke for connecting the teeth to each other, and coils wound around the teeth, wherein each tooth has a tip facing the rotor and has a height lower than those of the rotor and the yoke, a connector coupled with the yoke, and a neck, disposed between the connector and the tip and gradually higher from the sides thereof in the circumferential direction to the central portion thereof, around which each coil is wound.

Preferably, the teeth are manufactured by the iron powder metallurgy method, and the yoke is manufactured from an electrical steel sheet by the spiral method.

The connector of each tooth is inserted into a connector recess formed on the inner wall of the yoke in the vertical direction. The circumferential widths of the connector of each tooth and the connector recess of the yoke are gradually widened toward the yoke so as to prevent the separation in the radial direction.

The height of the connector of each tooth is equal to or greater than the height of the tip of each tooth, but not higher than the height of the yoke.

Moreover, the height of the neck of each tooth is lower than the height of the tip of each tooth.

According to the stator of a motor in accordance with the present invention, at least the teeth are manufactured by the iron metallurgy method so as to minimize the manufacturing costs. In order to obtain the overhang effect, the height of the tip of each tooth is lower than the height of the rotor and the height of the yoke is higher than the height of the tip of each tooth, so that the proper efficiency of a motor can be obtained.

BRIEF DESCRIPTION OF THE DRAWINGS

These and/or other objects and advantages of the present invention will become apparent and more readily appreciated from the following description of the embodiments, taken in conjunction with the accompanying drawings, in which.

DESCRIPTION OF THE PREFERRED EMBODIMENTS

Figure 1:
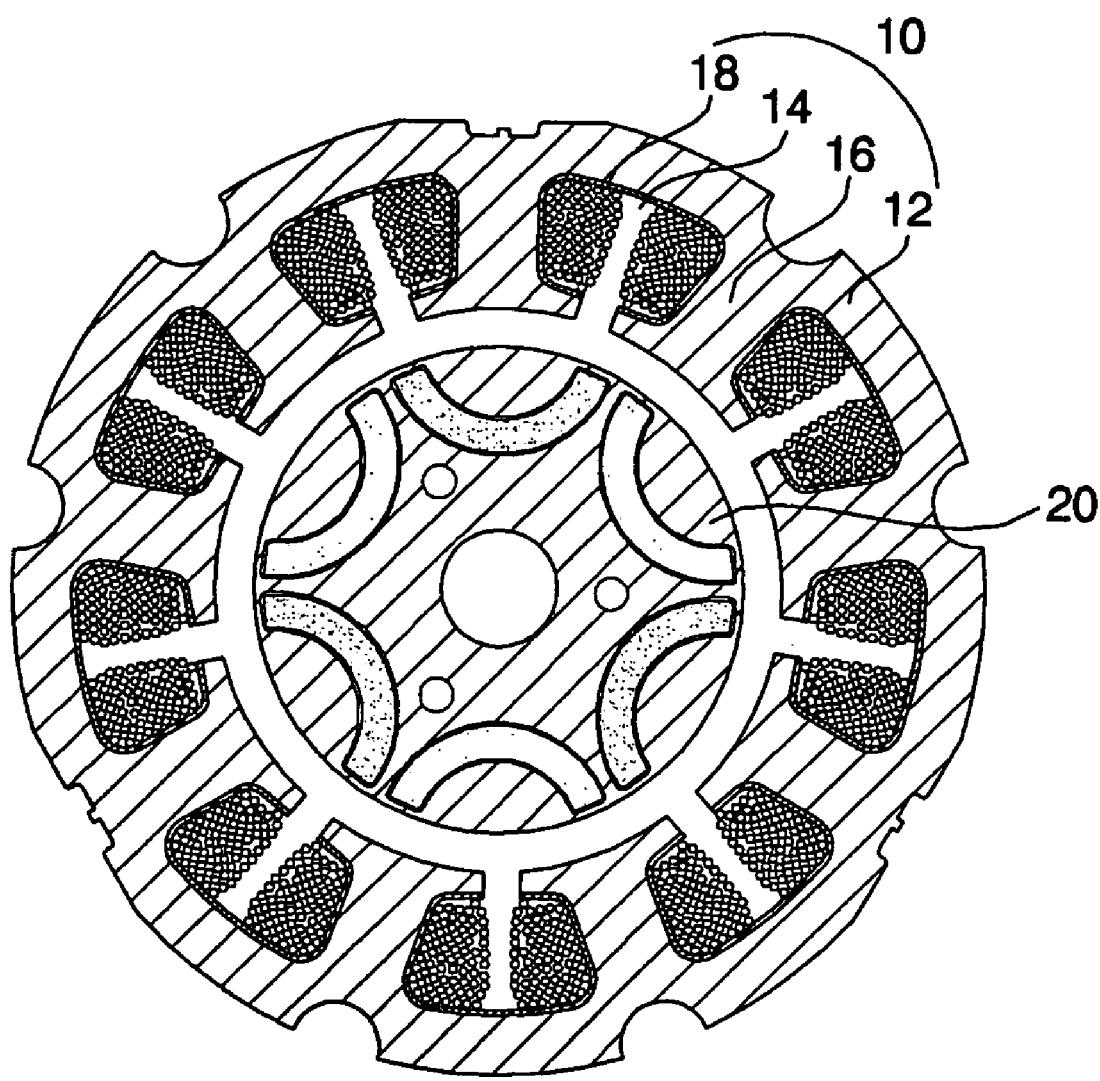
FIG. 1 is a planar cross-sectional view illustrating a stator of a conventional motor.

Hereinafter, embodiments of a stator of a motor according to the present invention will be described with reference to the accompanying drawings.

Several embodiments of the present invention may be described. Since the basic structure of the stator is identical to that of a stator of a conventional motor, a detailed description thereof will be omitted.

FIGS. 4 to 7 are views illustrating the stator of a motor according to the preferred embodiment of the present invention.

As shown in FIGS. 4 to 7, the stator S of a motor includes a plurality of teeth 60 spaced apart from each other in the circumferential direction (indicated by an arrow C) by slots 52 formed therebetween, a ring-shaped yoke 70 for integrating the teeth 60 in one body, and coils (not shown) wound around the teeth 60.

Each tooth 60 includes a tip 62 facing the rotor 50 in the radial direction, and a neck 64, disposed between the tip 62 and the yoke 70, on which the coil is wound.

Especially, in order to increase the amount of the effective magnetic fluxes of the teeth 60 due to the overhang effect, at least the tip 62 among the components constituting the teeth 60 is manufactured to have a height 62H lower than the height 50H of the rotor 50.

In addition, in order to obtain the overhang effect, it is preferred that a height 70H of the yoke 70 is higher than the height 62H of the tip 62 of the tooth 60 so that the core loss can be minimized even when the height 62H of the tip 62 of the tooth 60 is lower than the height 50H of the rotor 50.

As such, if conditions except for the size of the yoke 70, for example, the size of the rotor and the number of the teeth are identical, a motor has following advantages.

When the inner diameter and the outer diameter of the yoke 70 are limited to predetermined values, since the sectional area of the yoke 70 is increased as the height 70H of the yoke 70 is higher than the height 62H of the tip 62 of the tooth 60, the core loss of the yoke 70 is minimized. On the other hand, manufacturing costs are also increased in proportion to the sectional area of the yoke 70. When the sectional area and the outer diameter of the yoke 70 are limited, since the inner diameter of the yoke 70 becomes relatively large as the height 70H of the yoke 70 is higher than the height 62H of the tip 62 of the tooth 60 so that the slots 52 can be formed to have greater widths, windings of the coils can be advantageously designed. In addition, since the circumferential widths of the teeth 60 can be relatively widened, the sectional areas of the teeth 60 can be increased and the core loss of the teeth 60 can be decreased.

The teeth 60 and the yoke 70 constructed as described above are preferably integrated with each other by the iron powder metallurgy method so as to obtain the overhang effect and the minimization of the core loss of the yoke 70 simultaneously and to minimize the manufacturing costs.

Figure 6:
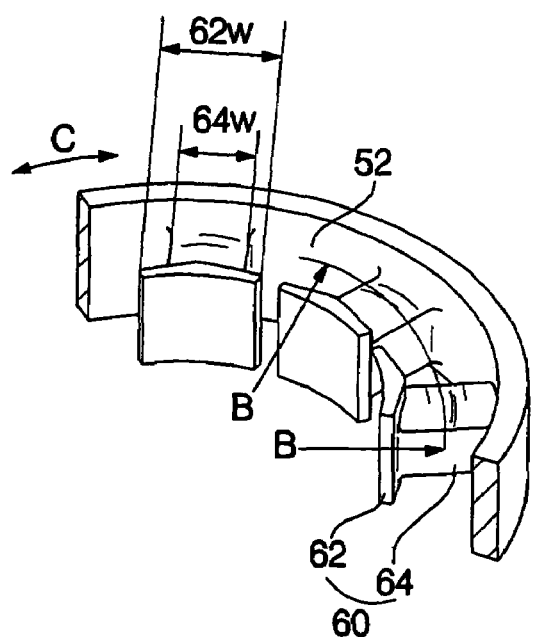
FIG. 6 is a partially cut perspective view illustrating a stator of a motor according to the present invention.
Figure 7:
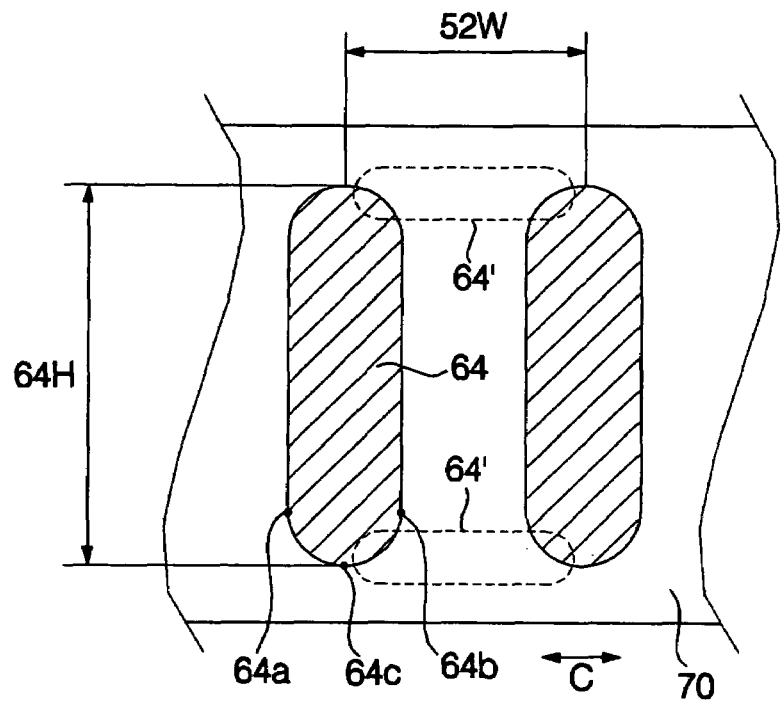
FIG. 7 is a cross-sectional view taken along the line B-B in FIG. 6.

FIG. 6 is a partially cut perspective view illustrating a stator of a motor according to the present invention, and FIG. 7 is a cross-sectional view taken along the line B-B in FIG. 6.

Meanwhile, the stator according to the present invention may be manufactured such that the heights 64H of the necks 64 of the teeth 60 gradually increase from the sides 64a and 64b to the central portion 64c in the circumferential direction (arrow C). The necks 64 of the teeth 69 may have an oval cross-section.

Then, since the necks 64 of the teeth, as indicated by reference numeral 64' in FIG. 7, are gradually spaced apart from neighboring necks 64, in other words, the distance between ends of neighboring necks 64 is gradually increased and the slots 52 are also gradually increased while the upper and lower sides of the necks 64 towards the upper ends of the necks 64, the end coil, which is protruded from each neck 64 of the teeth 60, can be minimized. In other words, the copper loss is decreased when the end coil is reduced so that the electric resistance is reduced, thus, the efficiency of the motor can be enhanced.

Moreover, since the widths 64W of the necks 64 of the teeth 60 can be widened when the outer diameter and the sectional area of the yoke 70 are uniform, the height 64H may be lower than those of the tips 62 of the teeth 60 and the widths 64W may be narrower than the widths 62W of the tips 62 of the teeth 60.

Figure 2:
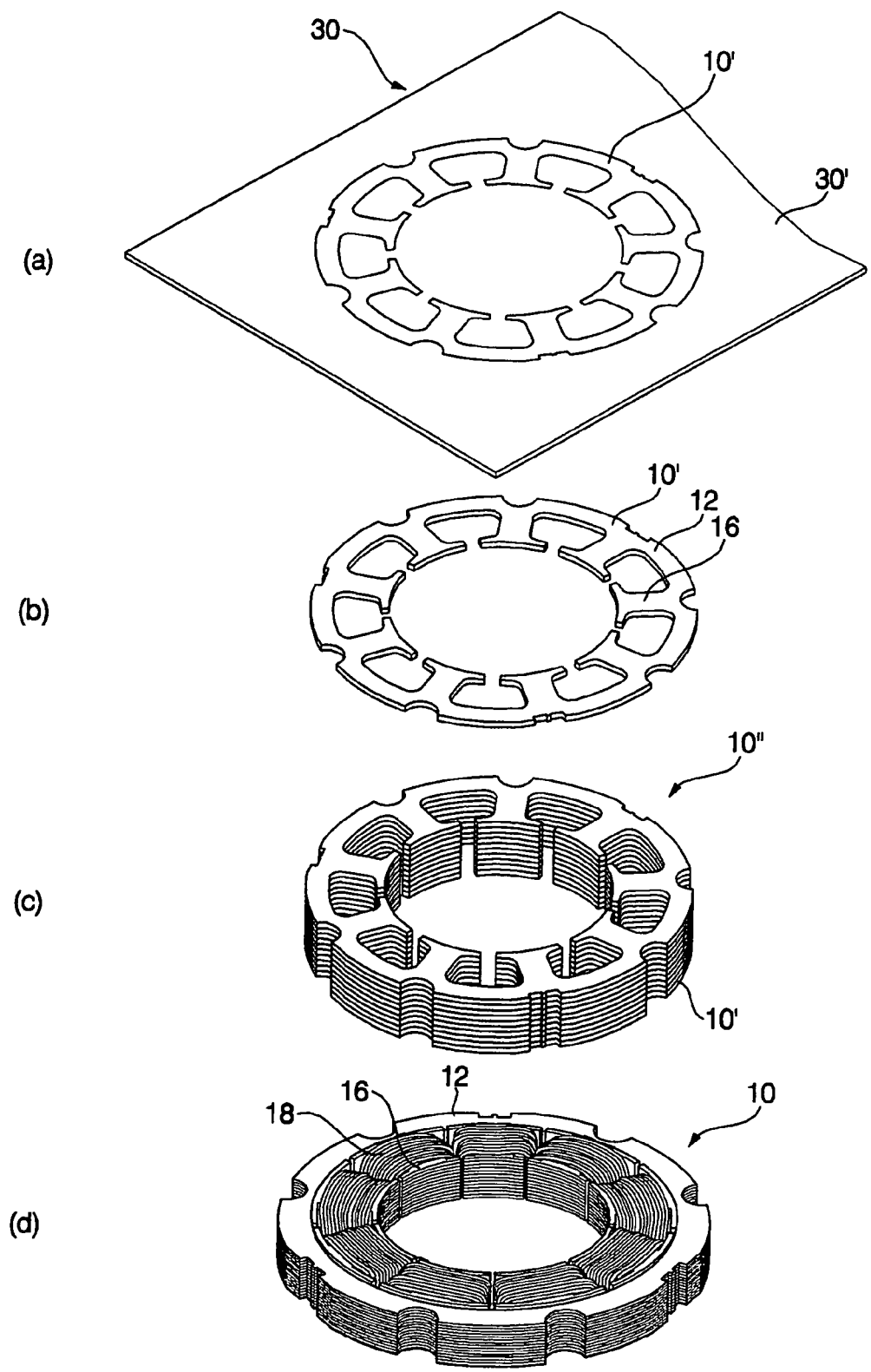
FIG. 2 is a view illustrating the manufacturing process of a stator of a conventional motor.
Figure 3:
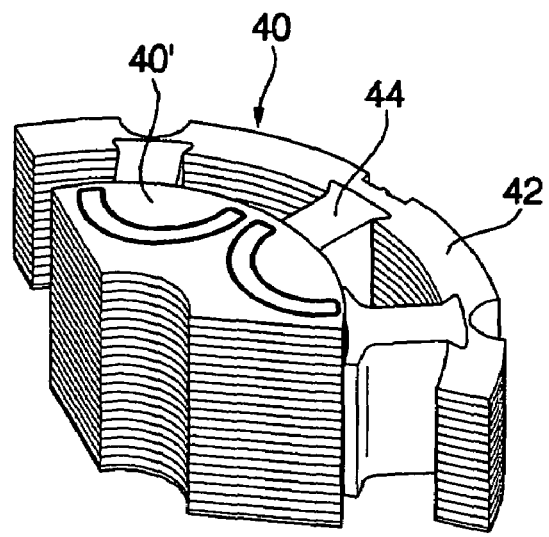
FIG. 3 is a partially cut perspective view illustrating a stator of a conventional motor.
Figure 4:
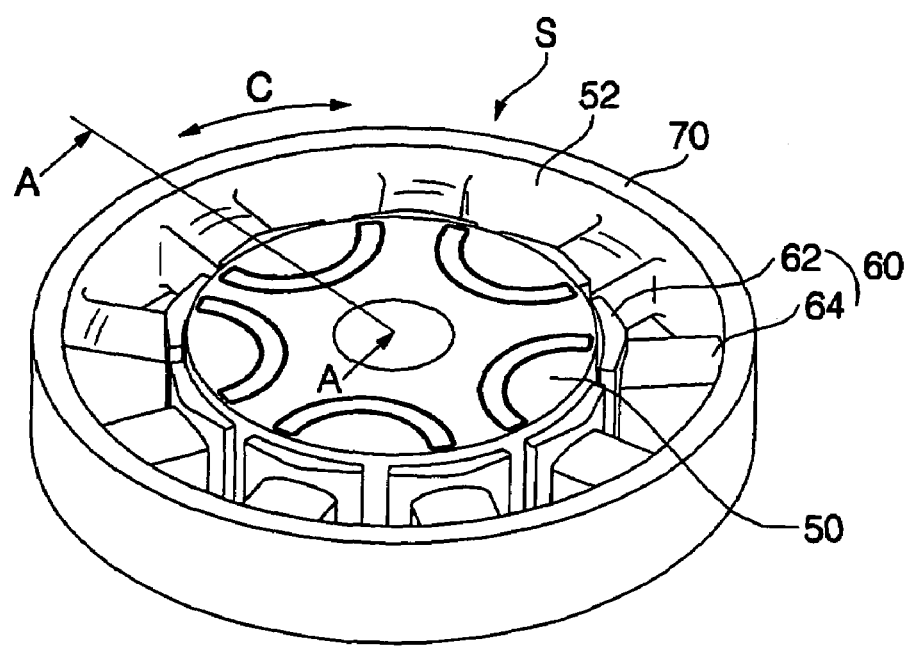
FIG. 4 is a perspective view illustrating a stator of a motor according to a preferred embodiment of the present invention.
Figure 5:
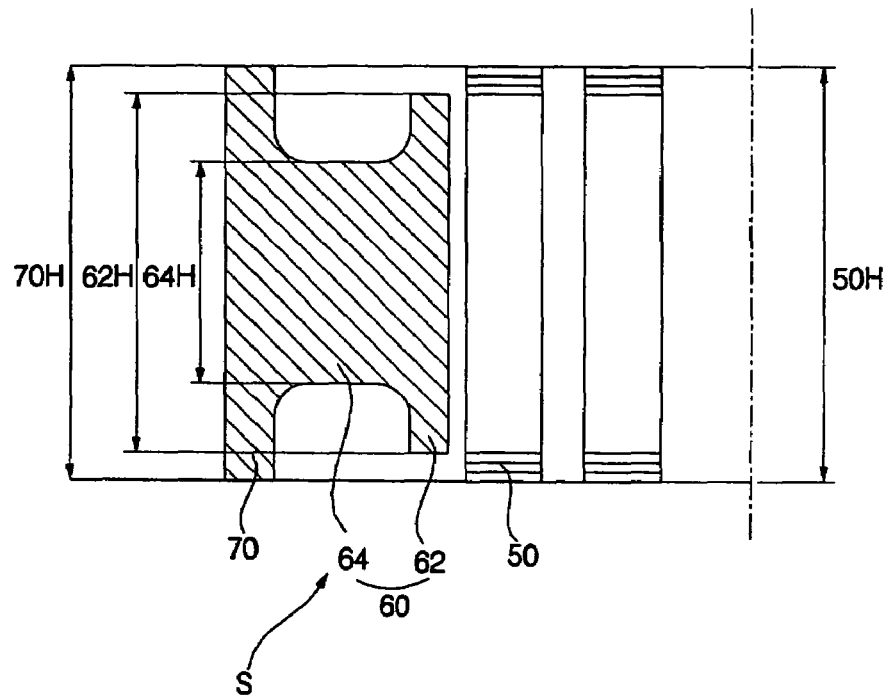
FIG. 5 is a cross-sectional view taken along the line A-A in FIG. 4.

As described above, according to the stator S of a motor in accordance with the preferred embodiment of the present invention, the teeth 60 and the yoke 70 are integrally manufactured by the iron powder metallurgy method so that they can be designed to have various shapes in comparison with when they are manufactured from the electrical steel sheet as shown in FIGS. 1 and 2, and the manufacturing costs can also be reduced. In addition, since the heights 62H of the tips 62 of the teeth 60 are lower than the height 50H of the rotor 50 and the height 70H of the yoke 70 is higher than the heights 62H of the tips 62 of the teeth 60, the efficiency of the motor cannot be deteriorated in comparison with the motor employing the stator manufactured from the electrical steel sheet as shown in FIGS. 1 and 2.

Moreover, according to the stator S of a motor according to the present invention, since the heights 64H of the necks 64 of the teeth 60 gradually increase from the sides 64a and 64b to the central portions 64c in the circumferential direction so as to minimize the end coil, the efficiency of the motor is more enhanced.

Hereinafter, the other preferred embodiment of the present invention will be described with reference to FIGS. 8 through 11, and since the spirit and basic structure of this embodiment are identical to the preferred embodiment described with reference to FIGS. 4 through 7, the description and drawings for the identical components will be omitted.

Figure 8:
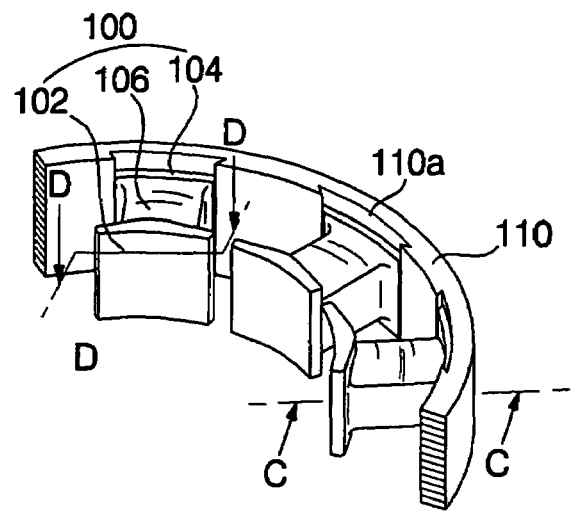
FIG. 8 is a partially cut perspective view illustrating a stator of a motor according to the other preferred embodiment of the present invention.
Figure 9:
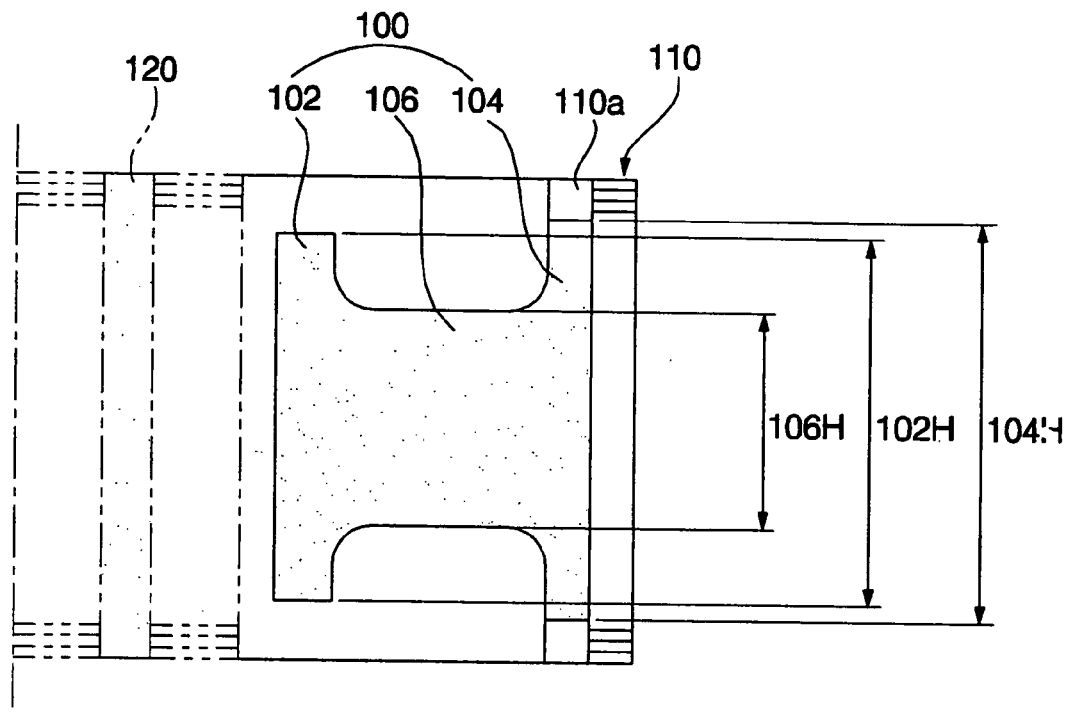
FIG. 9 is a cross-sectional view taken along the line C-C in FIG. 8.
Figure 10:
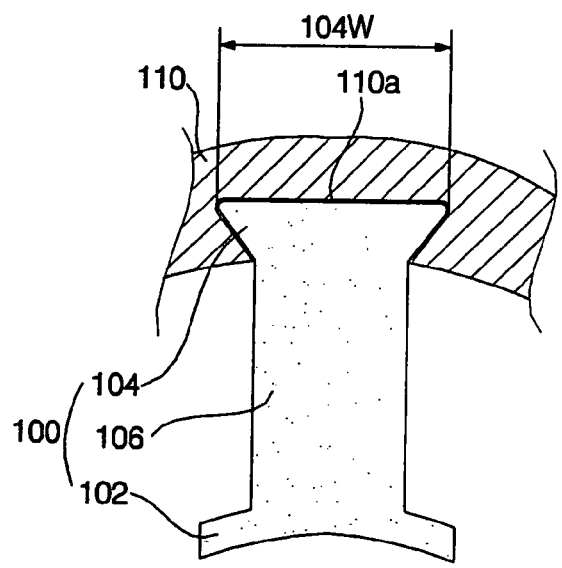
FIG. 10 is a cross-sectional view taken along the line D-D in FIG. 8.

The stator depicted in FIGS. 8 through 10 is manufactured such that teeth 100 are manufactured by the iron powder metallurgy method and a yoke 110 is manufactured from an electrical steel sheet by the spiral method, and then they are coupled with each other.

Each tooth 100 faces a rotor 120 in the radial direction, and includes a tip 102 having a lower height 102H than those of the rotor 120 and a yoke 110, a connector 104 coupled with the yoke 110, and a neck 106, disposed between the connector 104 and the tip 102, around which a coil is wound.

The connector 104 is inserted into a connecting recess 110a formed on the inner wall of the yoke 110 so as to fit the teeth 100 into the yoke 110 in the vertical direction.

In order to prevent the teeth 100 and the yoke 110 from being separated from each other in the radial direction, the width 104W of the connector 104 of each tooth 100 may be gradually widened while running toward the yoke 100, and the planar sectional shapes of the teeth 100, the connector 104, and a connector recess 110a of the yoke 110 may have a trapezoidal shape so as to form the planar sectional shape of the connector recess 110a of the yoke 110 identical to that of the connector 104. In other words, the teeth 100, the connector 104, and the connector recess 110a of the yoke 110 may have a trapezoidal shape.

In addition, it is preferred that at least the height 104H of the connector 104 of each tooth 100 is the same as the height 102H of the tip 102 of each tooth 100, but not higher than that of the yoke 110.

The height 106H of the neck 106 of each tooth 100 may be lower than the height 102H of the tip 102 of each tooth 100, or may be gradually higher while running from the sides of the neck 106 to the central portion of the neck 106 in the circumferential direction.

Figure 11:
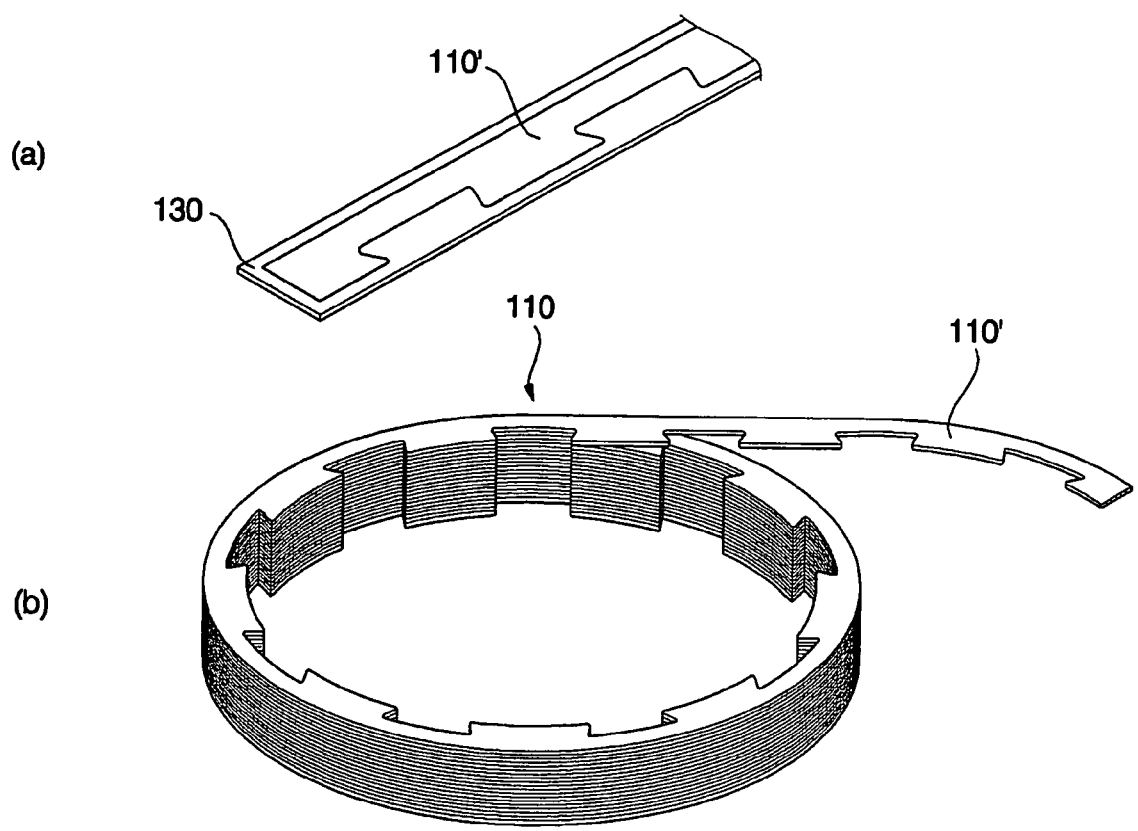
FIG. 11 is a view illustrating the manufacturing process of a yoke in the stator of a motor according to the other preferred embodiment of the present invention.

The yoke 110, as shown in FIG. 11, is manufactured such that, at first, a strap-like yoke 110', which has a shape that a ring-shaped yoke 110 is straightened, is cut away from an electrical steel sheet 130 (See FIG. 11a), and the strap-like yoke 110' is wound to a desired height to form a spiral shape (See FIG. 11b).

According to the stator of a motor in accordance with the other embodiment of the present invention, the manufacturing costs can be reduced and sufficient efficiency of a motor can be obtained in comparison with a motor having the stator in FIGS. 1 and 2 manufactured from the electrical steel sheet.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A stator of a motor comprising:
   a plurality of teeth spaced apart from each other along the circumference of a rotor;
   a yoke for connecting the teeth to each other; and
   coils wound around the teeth;
   wherein the height of a tip of each tooth facing the rotor is lower than the height of the rotor, and the height of the yoke is higher than the height of the tip of each tooth,
   wherein the height of the rotor and the height of the yoke are substantially the same, and
   wherein a top surface of the yoke and a top surface of the rotor are substantially co-planar.

2. The stator of a motor as set forth in claim 1, wherein each tooth has a neck, between the tip of each tooth and the yoke, around which the coil is wound, the neck having an upper arcuate surface, a lower arcuate surface and two substantially straight vertical sidewalls between and connecting the upper arcuate surface and the lower arcuate surface.

3. The stator of a motor as set forth in claim 2, wherein the height of the neck of each tooth is lower than that of the tip of each tooth.

4. The stator of a motor as set forth in claim 1, wherein the teeth and the yoke are integrated with each other by the iron powder metallurgy method.

5. The stator of a motor as set forth in claim 4, wherein each tooth has a neck, between the tip of each tooth and the yoke, around which the coil is wound, the neck having an upper arcuate surface, a lower arcuate surface and two substantially straight vertical sidewalls between and connecting the upper arcuate surface and the lower arcuate surface.

6. The stator of a motor as set forth in claim 5, wherein the height of the neck of each tooth is lower than the height of the tip of each tooth.

7. A stator of a motor comprising:
   a plurality of teeth spaced apart from each other along the circumference of a rotor, each of the teeth having a connector;
   a yoke for connecting the teeth to each other, the yoke having a plurality of connector recesses on an inner circumferential wall of the yoke, each of the connectors being inserted into a corresponding one of the connector recesses; and coils wound around the teeth;
wherein the height of a tip of each tooth facing the rotor is lower than the height of the rotor, the height of the yoke is higher than the height of the tip of each tooth, and the teeth and the yoke are made of different materials,
wherein the height of the connector of each of the teeth is greater than the height of the tip of each of the teeth, but not higher than the height of the yoke.

8. The stator of a motor as set forth in claim 7, wherein the teeth are manufactured by the iron powder metallurgy method, and the yoke is manufactured from an electrical steel sheet by the spiral method.

9. The stator of a motor as set forth in claim 8, wherein the connector recesses are formed on the inner circumferential wall of the yoke in a vertical direction.

10. The stator of a motor as set forth in claim 9, wherein the circumferential widths of the connector of each tooth and the connector recess of the yoke are substantially continuously widened from one end facing the neck to an opposite end facing the yoke so as to prevent the separation in the radial direction.

11. The stator of a motor as set forth in claim 9, wherein the height of each tooth is lower than the height of the yoke.

12. The stator of a motor as set forth in claim 8, wherein each tooth has a neck, provided between the tip of each tooth and the yoke, around which the coils are wound, and the neck has an upper arcuate surface, a lower arcuate surface and two substantially straight vertical sidewalls between and connecting the upper arcuate surface and the lower arcuate surface.

13. The stator of a motor as set forth in claim 12, wherein the height of the neck of each tooth is lower than the height of the tip of each tooth.

14. The stator of a motor as set forth in claim 8, wherein the teeth and the yoke are coupled to each other in the vertical direction by fitting.

15. A stator of a motor comprising:
a plurality of teeth spaced apart from each other along the circumference of a rotor;
a yoke for connecting the teeth to each other; and
coils wound around the teeth;
wherein each tooth includes
a tip facing the rotor and having the height lower than those of the rotor and the yoke,
a connector coupled with the yoke, and
a neck, disposed between the connector and the tip, around which each coil wound, the neck having an upper arcuate surface, a lower arcuate surface and two substantially straight vertical sidewalls between and connecting the upper arcuate surface and the lower arcuate surface, wherein the height of the connector of each tooth is greater than the height of the tip of each tooth, but not higher than the height of the yoke.

16. The stator of a motor as set forth in claim 15, wherein the teeth are manufactured by the iron powder metallurgy method, and the yoke is manufactured from an electrical steel sheet by the spiral method.

17. The stator of a motor as set forth in claim 16, wherein the connector of each tooth is inserted into a connector recess formed on an inner circumferential wall of the yoke in a vertical direction.

18. The stator of a motor as set forth in claim 17, wherein the circumferential widths of the connector of each tooth and the connector recess of the yoke are substantially continuously widened from one end facing the neck to an opposite end facing the yoke so as to prevent the separation in the radial direction.

19. The stator of a motor as set forth in claim 16, wherein the height of the neck of each tooth is lower than the height of the tip of each tooth.

20. The stator of a motor as set forth in claim 1, wherein each of the teeth has a connector, the yoke having a plurality of connector recesses on an inner circumferential wall of the yoke, each of the connectors being inserted into a corresponding one of the connector recesses, the height of the connector of each of the teeth being greater than the height of the tip of each of the teeth.

21. The stator of a motor as set forth in claim 20, wherein each of the teeth has a neck, disposed between the connector and the tip, around which each coil wound, the neck having an upper arcuate surface, a lower arcuate surface and two substantially straight vertical sidewalls between and connecting the upper arcuate surface and the lower arcuate surface.

22. The stator of a motor as set forth in claim 7, wherein the height of the rotor and the height of the yoke are substantially the same.

23. The stator of a motor as set forth in claim 22, wherein a top surface of the yoke and a top surface of the rotor are substantially co-planar.

24. The stator of a motor as set forth in claim 15, wherein the height of the rotor and the height of the yoke are substantially the same.

25. The stator of a motor as set forth in claim 24, wherein a top surface of the yoke and a top surface of the rotor are substantially co-planar.

26. The stator of a motor as set forth in claim 15, wherein the height of the connector of each tooth is lower than the height of the yoke.

27. A stator of a motor comprising:
a plurality of teeth spaced apart from each other along a circumference of a rotor;
a yoke for connecting the teeth to each other; and
coils wound around the teeth;
wherein the height of a tip of each tooth facing the rotor is lower than the height of the rotor, and the height of the yoke is higher than the height of the tip of each tooth,
wherein the teeth are protruded radially from an inner surface of the yoke toward the rotor which is positioned inside the yoke, and
wherein a top surface of the yoke and a top surface of the rotor are substantially co-planar.

* * * * *